(12) United States Patent
Young et al.

(10) Patent No.: US 11,983,774 B1
(45) Date of Patent: May 14, 2024

(54) SYSTEMS AND METHODS FOR DETERMINING A FIXED RATE BASED ON BEHAVIOR

(71) Applicant: United Services Automobile Associate (USAA), San Antonio, TX (US)

(72) Inventors: Stephen Young, San Antonio, TX (US); Michael A. Merwarth, San Antonio, TX (US); Jon-Michael Kowall, San Antonio, TX (US); Michael Kyne, San Antonio, TX (US); Carolyn Knopf, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 692 days.

(21) Appl. No.: 16/896,019

(22) Filed: Jun. 8, 2020

Related U.S. Application Data

(62) Division of application No. 15/615,637, filed on Jun. 6, 2017, now Pat. No. 10,679,297.

(60) Provisional application No. 62/346,376, filed on Jun. 6, 2016.

(51) Int. Cl.
  *G06Q 40/08* (2012.01)
  *G06Q 40/00* (2023.01)

(52) U.S. Cl.
  CPC ............. *G06Q 40/08* (2013.01); *G06Q 40/00* (2013.01)

(58) Field of Classification Search
  CPC ...................................................... G06Q 40/08
  See application file for complete search history.

(56) References Cited

U.S. PATENT DOCUMENTS

| | | | |
|---|---|---|---|
| 9,984,420 B1* | 5/2018 | Manzella | G06Q 40/08 |
| 10,373,261 B1* | 8/2019 | Kellett | G06Q 40/08 |
| 10,380,692 B1* | 8/2019 | Parker | G06Q 40/08 |
| 2005/0137914 A1 | 6/2005 | Schmitter | |
| 2006/0063038 A1 | 3/2006 | Warren | |
| 2010/0131304 A1 | 5/2010 | Collopy | |
| 2013/0346115 A1* | 12/2013 | Peak | G01C 21/36 705/4 |
| 2014/0142989 A1* | 5/2014 | Grosso | G06Q 40/00 705/4 |
| 2014/0167967 A1 | 6/2014 | He et al. | |
| 2016/0086393 A1 | 3/2016 | Collins et al. | |

\* cited by examiner

*Primary Examiner* — Jessica Lemieux
(74) *Attorney, Agent, or Firm* — Fletcher Yoder, P.C.

(57) ABSTRACT

A system may include a vehicle system configured to monitor one or more monitor variables related to a vehicle. The system may also include a processor that may receive a selection of the one or more monitor variables to monitor and receive data from the vehicle system. The data may be limited based on the selection of the one or more monitor variables. The processor may then determine a fixed rate premium for at least two years based on the data and display a visualization that may include the fixed rate premium on a display.

20 Claims, 7 Drawing Sheets

SYSTEMS AND METHODS FOR DETERMINING A FIXED RATE BASED ON BEHAVIOR

CROSS-REFERENCE TO RELATED APPLICATION

This application is a divisional of U.S. patent application Ser. No. 15/615,637, filed Jun. 6, 2017, and further claims priority to and the benefit of U.S. Provisional Application No. 62/346,376, entitled "SYSTEMS AND METHODS FOR DETERMINING A FIXED RATE BASED ON BEHAVIOR," filed Jun. 6, 2016, which is hereby incorporated by reference in its entirety for all purposes.

BACKGROUND

The present disclosure relates generally to systems and methods for generating fixed and variable insurance premium rates. More specifically, the present disclosure relates to determining fixed and variable insurance premium rates for vehicle insurance, life insurance, home insurance, and the like based on data regarding an applicants' vehicle usage, lifestyle, and home use.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a vehicle system configured to monitor one or more monitor variables related to a vehicle. The system may also include a processor that may receive a selection of the one or more monitor variables to monitor and receive data from the vehicle system. The data may be limited based on the selection of the one or more monitor variables. The processor may then determine a fixed rate premium for at least two years based on the data and display a visualization that may include the fixed rate premium on a display.

In another embodiment, a system may include a home system that monitors one or more monitor variables related to a home. The system may also include a processor that receives a selection of the one or more monitor variables to monitor and receive a first set of data from the home system, such that the first set of data is limited based on the selection of the one or more monitor variables. The processor may then determine a fixed rate premium for at least two years based on the first set of data and display a visualization comprising the fixed rate premium on a display.

In yet another embodiment, a system may include a wearable device that monitors one or more monitor variables related to a human. The system may also include a processor that receives a selection of the one or more monitor variables to monitor and receives a first set of data from the wearable device, such that the first set of data is limited based on the selection of the one or more monitor variables. The processor may then determine a fixed rate premium for at least two years based on the first set of data and display a visualization comprising the fixed rate premium on a display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
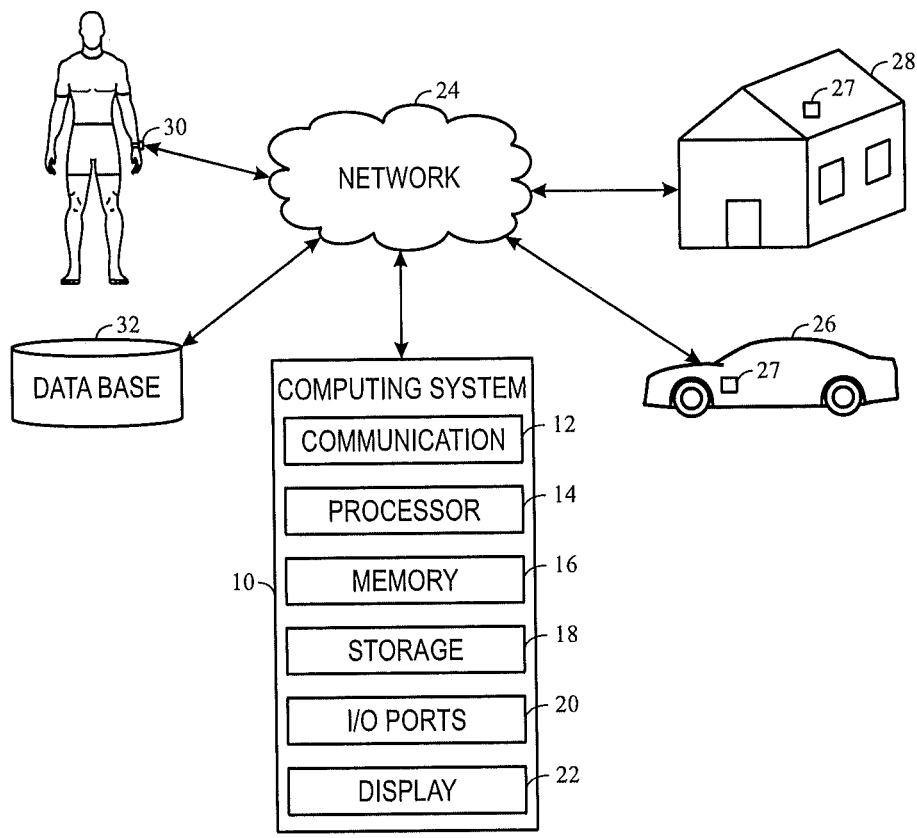
FIG. 1 illustrates a block diagram of a computing system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Insurance premium rates are commonly determined on a semi-annual or annual basis for any applicant based on certain information regarding the applicant and the type of insurance that the applicant is seeking. For instance, when determining a vehicle insurance premium rate for an applicant, a computing system may analyze a driving record of the applicant, information regarding the vehicle being insured, the amount of miles that the applicant expects to drive, and the like. Using this information, the computing system may generate an annual premium rate that will be reevaluated after one year.

However, it is presently recognized that many insurance customers do not wish for their premium rates to be reevaluated each year. The reevaluation process often results in a different premium for the customer each year. As such, the customer cannot accurately budget for his finances for more than one year at a time. With this in mind, insurance customers may be intrigued to obtain insurance through an insurance provider that is capable of providing an insurance premium rate that is fixed for a number of years. Of course, to insure an individual at a fixed rate for a number of years, the insurance provider assumes more risk in insuring the applicant, as compared to when it adjusts its rate annually. To assist insurance providers to provide a competitive rate for a fixed number of years, computing systems in accordance with present embodiments may be designed to determine a fixed premium rate for a number of years based on data regarding the applicant via vehicle, activity, and home sources to confirm a risk level associated with the applicant.

Although many insurance customers prefer fixed rate premiums, some customers may be interested in obtaining a variable rate premium that adjusts based on the customers' behavior. As such, in certain embodiments of the present disclosure, a computing system may receive data regarding the applicant via vehicle systems, activity devices, and home sources and regularly adjust the rate premium based on the applicant's behavior. The computing system may provide a visual indication of the applicant's current premium rate and may update the current premium rate as the rate changes based on data received from the data sources. By monitoring certain behavior patterns regarding insurance applicants, the computing system may assess risks associated with the respective applicants more accurately. As a result, the computing system may enable the insurance providers to generate competitive insurance premium rates while adequately accounting for the risk associated with insuring each individual. Additional details regarding systems and techniques for generating fixed and variable premium rates for various types of insurance policies (e.g., vehicle, life, home) will be discussed below with reference to FIGS. 1-11.

By way of introduction, FIG. 1 is a block diagram of a computing system 10 communicatively coupled to a variety of data sources that may assist the computing system 10 in determining premium rates for various types of insurance policies (e.g., vehicle, life, home). The computing system 10 may include any suitable computer device, such as a general-purpose personal computer, a laptop computer, a tablet computer, a mobile computer, and the like that is configured in accordance with present embodiments. The computing system 10 may include various types of components that may assist the computing system 10 in performing various types of computer tasks and operations. For example, the computing system 10 may include a communication component 12, a processor 14, a memory 16, a storage 18, input/output (I/O) ports 20, a display 22, and the like. The communication component 12 may be a wireless or wired communication component that may facilitate communication between the computing system 10 and various other computing systems via a network, the Internet, or the like.

The processor 14 may be any type of computer processor or microprocessor capable of executing computer-executable code. The processor 14 may also include multiple processors that may perform the operations described below.

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from a user of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10.

It should be noted that the components described above with regard to the computing system 10 are examples and the computing system 10 may include additional or fewer components as shown.

In certain embodiments, the computing system 10 may be communicatively coupled to a network 24, which may include collections of computing systems, the Internet, an Intranet system, or the like. The network 24 may facilitate communication between the computing system 10 and various other data sources. For instance, the network 24 may be communicatively coupled to a vehicle system 26, a home system 28, a wearable device 30, or the like. In some embodiments, the network 24 may also be communicatively coupled to one or more databases 32, which may store data regarding individuals such as, driving records, flood plain information, and other information that may be publicly available regarding the individuals and relevant for obtaining vehicle insurance, life insurance, or home insurance. In addition, the database 32 may include an exposed application programming interface (API) that provides data services regarding the individual's vehicle use, home use, activity, or the like.

Referring back to the vehicle system 26 (which may be integrated with or include the vehicle), in certain embodiments, the vehicle system 26 may monitor the operation of the vehicle. For instance, the vehicle system 26 may monitor the driving speed of the vehicle, the locations of the vehicle, the times at which the vehicle is in use, and the like. To track this information, the vehicle system 26 may include similar components as the computing system 10 described above. In addition, the vehicle system 26 may be communicatively coupled to various sensors 27 or devices within the vehicle to acquire data regarding the operation of the vehicle. By way of example, the vehicle system 26 may be communicatively coupled to a global positioning system (GPS) of the vehicle, a speedometer of the vehicle, a temperature sensor of the vehicle, and other sensors that may provide information regarding the operation or location of the vehicle.

The home system 28 (which may be integrated with or include aspects of a home) may receive data from various sensors 27 or devices and devices that may provide information regarding a home. For instance, the home system 28 may receive data regarding whether an alarm system is activated, times at which the alarm system is activated, temperature of the home, an amount of electricity used within the home, an amount of water used within the home, an amount of gas used in the home, and the like. Like the vehicle system 26, the home system 28 may include similar components as described above with regard to the computing system 10.

The wearable device 30 may include any suitable device that may be physically attached to a human and may monitor the activity of the human. For example, the wearable device 30 may monitor the amount of steps taken by the human each day, the frequency of steps taken during different portions of the day, the heart rate of the human, the temperature of the human, and the like. The wearable device 30 may generate data that may be used to determine a number of calories that the human may burn each day. As such, the data acquired via the wearable device 30 may be associated with the health of a human. Like the vehicle system 26 and the home system 28, the wearable device 30 may include similar components as described above with regard to the computing system 10.

Although the vehicle system 26, the home system 28, the wearable device 30, and the database 32 are described as being communicatively coupled to the computing system 10 via the network 24, it should be noted that, in other embodiments, the vehicle system 26, the home system 28, the wearable device 30, and the database 32 may be communicatively coupled directly to the computing system 10.

Figure 2:
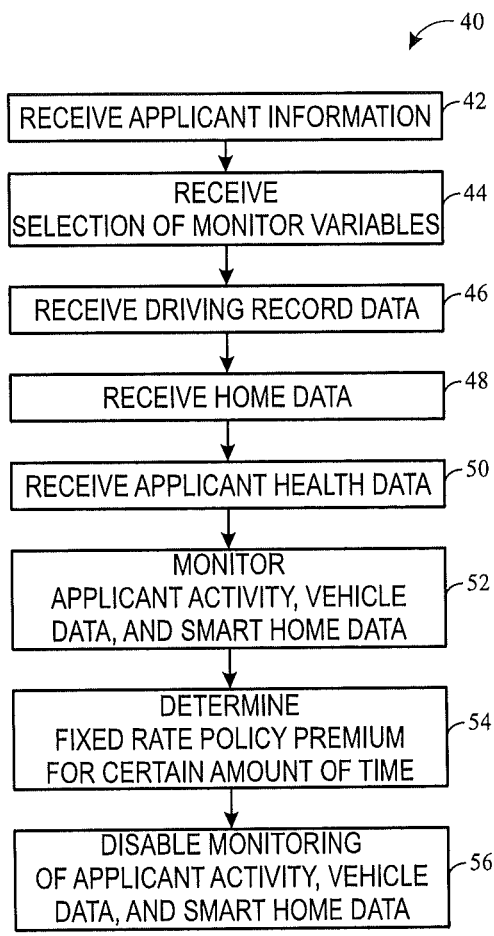
FIG. 2 illustrates a flow chart of a method for determining a fixed rate policy premium based on the data acquired from the data sources of FIG. 1, in accordance with embodiments described herein.

With the foregoing in mind, FIG. 2 illustrates a flow chart of a method 40 for determining a fixed rate policy premium based on the data acquired from the vehicle system 26, the home system 28, the wearable device 30, the databases 32, and the like. In general, the computing system 10 may receive information regarding an applicant for one or more types of insurance (e.g., vehicle, home, life), receive data regarding the applicant's behavior associated with operating a vehicle, living in a house, and general activity, and determine a fixed rate premium for a certain amount of time (e.g., years). Although the method 40 is described in a particular order, it should be noted that the method 40 may be performed in any suitable order and is not limited to the order presented herein. It should also be noted that each block described below in the method 40 may be performed by the computing system 10.

Referring now to FIG. 2, at block 42, the computing system 10 may receive applicant information regarding the individual seeking insurance. The applicant information may include a type of insurance that the applicant is seeking. For instance, the applicant may be interested in vehicle insurance, life insurance, home insurance, or some combination of the three. The applicant information may thus also include information relevant to an insurance provider for providing the listed insurance policies.

By way of example, the applicant information may include health information such as the applicant's age, weight, and height. The applicant information may also include information regarding the applicant's overall health such as whether he is a smoker, whether certain diseases are part of his family history, and other information that is collected by insurance providers when determining a premium rate for the applicant.

Figure 3:
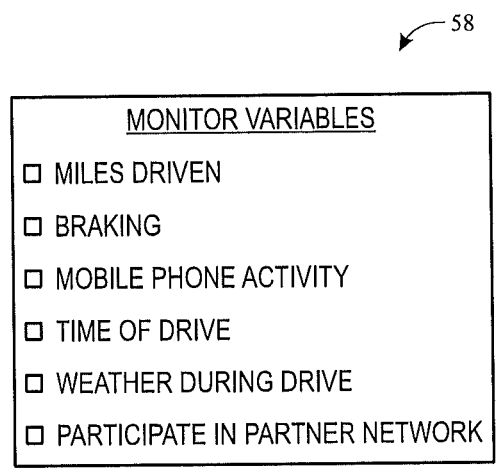
FIG. 3 illustrates an example visualization in a human machine interface (HMI) of a list of monitor variables that may be selected by the applicant for determining the policy premium rate according to the method of FIG. 2, in accordance with embodiments described herein.

At block 44, the computing system 10 may receive a selection of monitor variables associated with the applicant that the computing system 10 may monitor prior to providing a fixed premium rate for one or more types of insurance. The monitor variables may include various types of data acquired by the vehicle system 26, the home system 28, the wearable device 30, and the like. FIG. 3 illustrates an example visualization 58 including indications of the monitor variables. The visualization 58 may be depicted via the display 22 of the computing system 10 or another computing system. The monitor variables listed in the visualization 58 may be related to obtaining vehicle insurance and may include an amount of miles driven, the type of braking used, mobile phone activity while driving, the times at which the vehicle is driven, the weather during which the vehicle is driven, and the like.

In the same manner, the monitor variables may include items that may be monitored via the home system 28 or the wearable device 30. For instance, the monitor variables associated with the home system 28 may include alarm status (e.g., when activated, deactivated), an amount of electricity used, an amount of water used, an amount of gas used, weather associated with the home, and the like. The wearable device 30 may provide monitor variables such as the amount of steps taken each day, the amount of floors walked each day, the amount of time that the human is exercising, the amount of time the human is sleeping, the heart rate of the human, and the like.

After receiving the selection of monitor variables, the computing system 10, at block 46, may receive driving record data associated with the applicant. The driving record data may include information regarding previous accidents that the applicant was associated with, citations received for vehicle operation, and the like. In certain embodiments, the driving record data may be received via the database 32. Alternatively, the applicant may provide this information to the computing system 10 via a web-based application, a device coupled to the I/O ports 20, or the like.

At block 48, the computing system 10 may receive home data associated with the applicant. The home data may include details regarding the home structure that the applicant is trying to insure. As such, the home data may include details regarding the square footage of the house, the number of bedrooms and bathrooms in the house, the age of the house, the age of the roof, the proximity of the house to a fire station or fire hydrant, and other relevant information for home insurance. In certain embodiments, the computing system 10 may acquire this information from the database 32 based on the address of the house.

At block 50, the computing system 10 may receive health data regarding the applicant. The health data may include details regarding the applicant's health that may be useful in determining a life insurance policy premium. For instance, the health data may include whether the applicant is a smoker, blood work performed on the applicant, a list of family illnesses associated with the applicant, previous illnesses acquired by the applicant, and the like.

After receiving the selection of monitor variables and the data discussed above, at block 52, the computing system 10 may begin monitoring the monitor variables selected by the applicant at block 44 for a certain period of time. As such, the computing system 10 may receive data from the vehicle system 26, the home system 28, and/or the wearable device 30 for some period of time. This initial monitoring of the monitor variables by the computing system 10 may assist the computing system 10 to verify whether the data provided by the applicant is accurate. In one embodiment, after receiving the data at blocks 42-50, the computing system 10 may assess a risk value or score to the applicant for vehicle insurance, home insurance, and life insurance. The risk value may directly relate to the premium rate for each insurance type. By monitoring the applicant's activities for a period of time that is less than the fixed rate policy premium term, the computing system 10 may be capable of better assessing whether the risk value attributed to the applicant is accurate. For instance, if the applicant indicates that he has not received a citation related to operating his vehicle in the past three years and the computing system 10 receives data from the vehicle system 26 that the applicant regularly drives above the speed limit, the computing system 10 may adjust the initial risk score determined for the applicant based on the applicant's true driving behavior.

After monitoring the monitor variables for the defined amount of time, at block 54, the computing system 10 may determine a fixed rate policy premium value for vehicle insurance, home insurance, and life insurance for the applicant. As such, the computing system 10 may use the data acquired from blocks 42-52 to assess a risk value to insure the applicant over the period of time associated with the fixed rate policy. The fixed rate policy may refer to a rate that does not change for at least two years. To provide a fixed rate policy, the computing system 10 may account for various scenarios and situations that it may not consider when determining an annual policy rate. As such, the fixed rate premium will likely be higher than the premium obtained for a traditional annual policy plan. Although the price may be higher than traditional annual policy rates, some insurance customers may prefer the fixed rate plan to better anticipate and plan their respective budgets for more than one year. Moreover, some customers prefer to know that the policy rate will not increase over some period of time.

After determining the fixed rate policy premium, at block 56, the computing system 10 may disable the monitoring of the applicant. That is, the computing system 10 may refrain from receiving data from the vehicle system 26, the home system 28, and the wearable device 30. As such, the applicant may maintain their privacy regarding the data available to the computing system 10, while maintaining a fixed rate premium for a number of years. In some embodiments, after determining the fixed rate premium, the computing system may also send a notification via an electronic service such as text or email indicating the fixed rate premium to a computing system associated with the applicant. As such, the applicant may receive information regarding the determined fixed rate premium via a visualization presented on a display or by other suitable means.

Although the method 40 is described as being performed to determine a fixed rate premium for vehicle insurance, life insurance, and home insurance, it should be understood that, in certain embodiments, a fixed rate for a portion of one or more of these insurance types, one of these insurance types, or a combination of the listed insurance types may be determined. As such, depending on the type of insurance policy that the computing system 10 is determining a fixed rate for, the computing system 10 may receive a portion of data described above with respect to blocks 42-52 that is relevant to the respective policy type.

Figure 4:
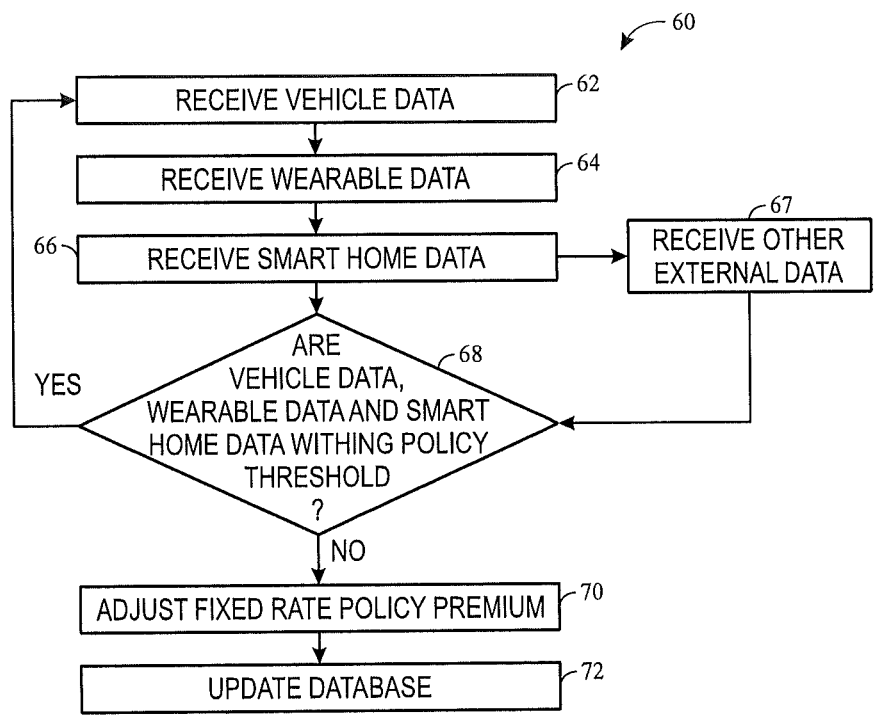
FIG. 4 illustrates a flow chart of a method for adjusting the fixed rate policy premium determined according to the method of FIG. 2, in accordance with embodiments described herein.

In some embodiments, during the monitoring period of block 52 of the method 40, the computing system 10 may perform the method 60 of FIG. 4. Referring to FIG. 4, at blocks 62, 64, and 66, the computing system 10 may receive vehicle data from the vehicle system 26, activity data from the wearable device 30, and home data from the home system 28, as described above. In addition, in some embodiments, at block 67, the computing system 10 may receive other external data that may be relevant regarding the applicant. For example, the other external data may include information regarding the applicant's driving record, criminal record, social media posts, and other publically available information. At block 68, the computing system 10 may determine whether the vehicle data, the wearable data, and the home data are within a threshold associated with the fixed rate policy premium. In some embodiments, the computing system 10 may determine an initial fixed rate premium before the monitoring period of block 52 in the method 40 of FIG. 1. During the monitoring period of block 52, the computing system 10 may continuously perform block 68 of the method 60. When the data received at block 68 is not within the policy threshold, the computing system 10 may proceed to block 70 and adjust the value for the pending fixed rate premium.

At block 72, the computing system 10 may update the database 32 or some storage device that stores information regarding a relationship between applicant data received at blocks 42-50 as compared to monitored data received at blocks 62-64. The computing system 10 may use the relationship data to better determine the fixed rate policy premium for other individuals that provide similar data.

Figure 5:
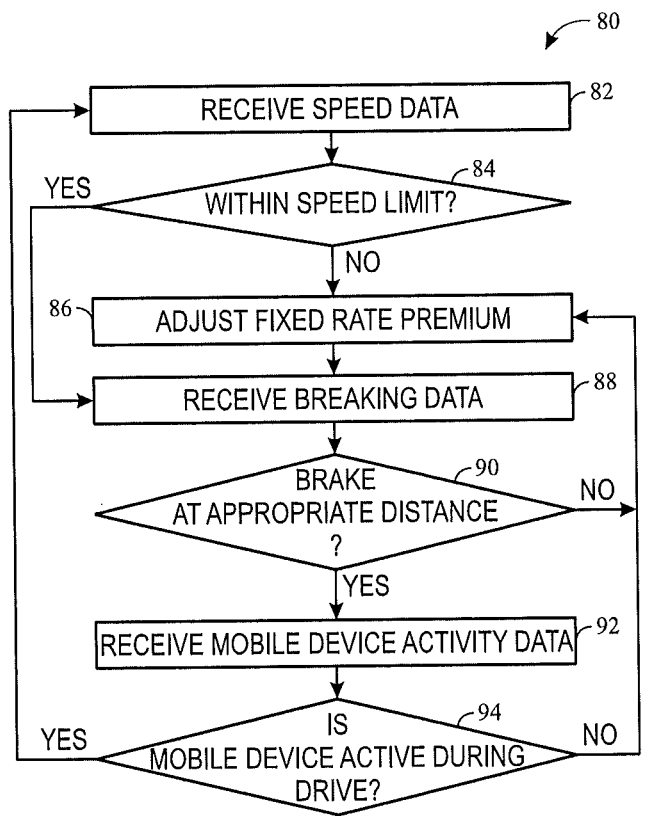
FIG. 5 illustrates a flow chart of an example method for adjusting a fixed rate policy premium based on an analysis of vehicle data associated with an applicant, in accordance with embodiments described herein.

FIG. 5 illustrates a flow chart of an example method 80 for adjusting a fixed rate policy premium based on an analysis of vehicle data received via the vehicle system 26 that is pending during the monitoring period. At block 82, the computing system 10 may receive speed data regarding the speed at which the vehicle travels during its trips via the vehicle system 26. The computing system 10 may then, at block 84, cross-reference the speed data with the speed limits in the corresponding roads to determine whether the vehicle was operating within the speed limit. If the vehicle did not operate within the speed limits, the computing system 10 may proceed to block 86 and adjust the initial fixed rate premium. That is, in one embodiment, the computing system 10 may increase the previously determined fixed rate premium to account for the increased risk associated with insuring the applicant in view of his driving behavior.

If, however, the vehicle does travel within the speed limits, the computing system 10 may proceed to block 88. At block 88, the computing system 10 may receive braking data from the vehicle system 26. The braking data may indicate an amount of pressure applied to the brakes of the vehicle during each stop, an amount of time the brakes were engaged before the vehicle stopped, and the like. At block 90, the computing system 10 may determine whether the brakes were applied within an appropriate stopping distance. For instance, the computing system 10 may determine whether the vehicle came to a stop within an appropriate amount of time and not braking to stops in less than an expected amount of time.

If the computing system 10 determines that the vehicle did not brake at the appropriate distance, the computing system 10 may proceed to block 86 and adjust the fixed rate premium appropriately. If, however, the computing system 10 determines that the braking data indicates that the vehicle is braking at appropriate distances, the computing system 10 may proceed to block 92.

At block 92, the computing system may receive mobile device activity data from a mobile computing device such as a mobile phone, tablet computing device, or the like. The mobile activity data may include information indicating when various applications are opened and accessed, when text messages or emails are drafted and sent, and other general information regarding the activity (e.g., operations) of the mobile device.

If, at block 94, the computing system 10 determines that the mobile device is active while the vehicle is in motion, the computing system 10 may proceed to block 86 and adjust the fixed rate premium to account for the increased risk of insuring the applicant in view of the mobile activity. Alternatively, if the computing system 10 determines that the mobile device is not active during the drive, the computing system 10 may return to block 82 and repeat the method 80 for the duration of the monitor period.

Figure 6:
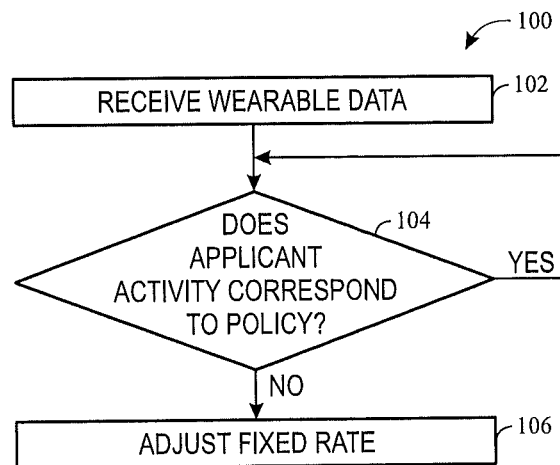
FIG. 6 illustrates a flow chart of an example method for adjusting a fixed rate policy premium based on an analysis of activity data associated with an applicant, in accordance with embodiments described herein.

In addition to data regarding the behavior of the applicant when operating a vehicle, the computing system 10 may also adjust the fixed rate premium based on the applicant's health data. For instance, FIG. 6 illustrates a flow chart of a method 100 for adjusting a fixed rate policy premium based on an analysis of activity data associated with an applicant received via the wearable device 30.

At block 102, the computing system 10 may receive activity data regarding the applicant from the wearable device 30 or via an application programming interface (API) that stores information received via the wearable device 30. At block 104, the computing system 10 may determine whether the detected activity corresponds to the policy expectations. For instance, the policy may indicate that the applicant is expected to walk 10,000 steps each day.

If the activity does not correspond to the policy expectation, the computing system 10 may proceed to block 106 and adjust the fixed rate premium. Alternatively, if the activity does correspond to the policy expectation, the computing system 10 may return to block 102 and continue to monitor the activity of the applicant.

Figure 7:
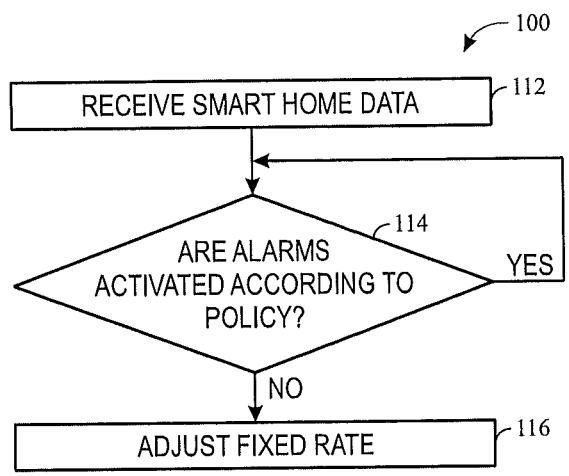
FIG. 7 illustrates a flow chart of an example method for adjusting a fixed rate policy premium based on an analysis of home data associated with an applicant, in accordance with embodiments described herein.

FIG. 7 illustrates a method 110 for adjusting the fixed rate premium based on data received via the home system 28. At block 112, the computing system 10 may receive data regarding the home associated with the applicant via the home system 28. For instance, the computing system 10 may receive information regarding alarm usage related to the home of the applicant.

At block 114, the computing system 10 may determine whether the alarms in the home are activated according to the policy expectations. For instance, the computing system 10 may determine whether the alarms are set during the day when the applicant is away from the home, whether the alarms activated to a stay-mode at night, whether the alarms are used regularly, whether proper testing occurs, and the like.

If the alarms are not activated according to the expectations of the policy, the computing system 10 may proceed to block 116 and adjust the fixed rate premium. If, however, the alarms are activated according to the expectations of the policy, the computing system 10 may return to block 112. As such, the computing system 10 may continuously perform the method 110 during the monitoring period.

Figure 8:
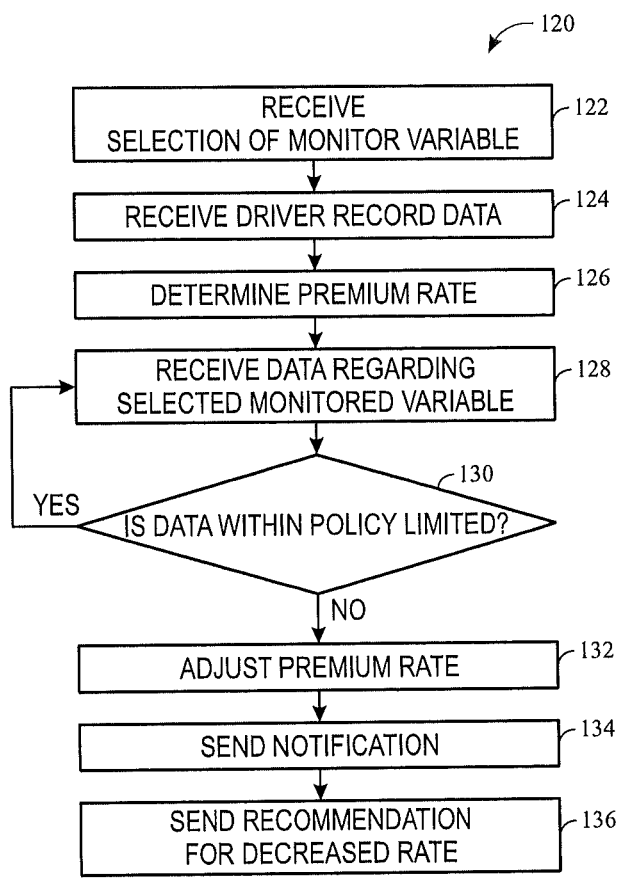
FIG. 8 illustrates a flow chart of a method for determining a variable rate policy premium based on monitor variables selected by an applicant, in accordance with embodiments described herein.

It should be noted that, in some embodiments, the methods 60, 80, 100, and 110 of FIGS. 4, 5, 6, and 7 may also be performed to adjust a variable rate premium for an insurance customer. In this case, the vehicle data, the health data, and the activity data may be continuously monitored by the computing system 10 even after the monitoring period described above. FIG. 8, for instance, illustrates a flow chart of a method 120 for adjusting a variable rate premium based on data received from the vehicle system 26.

Although the method 120 will be described as being performed by the computing system 10, it should be understood that any suitable computing system may perform the method 120. In addition, it should be noted that the method 120 is not limited to being performed in the presented order. Instead, the method 120 may be performed in any suitable order. Moreover, it should also be noted that each block of the method 120 may not be performed by the computing system 10.

Figure 9:
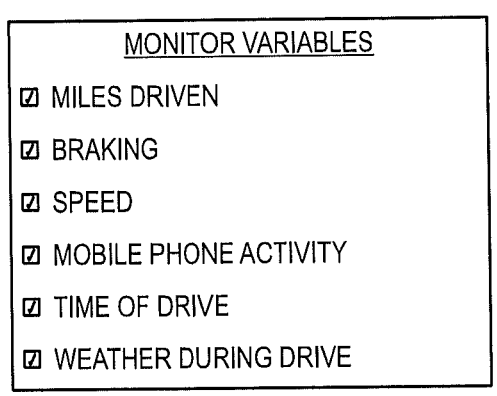
FIG. 9 illustrates an example visualization of certain monitor variables that have been selected by the applicant with respect to the method of FIG. 8, in accordance with embodiments described herein.

Referring now to FIG. 8, at block 122, the computing system 10 may receive a selection of monitor variables, as described above with regard to block 44 of FIG. 2 and the visualization 58 of FIG. 3 discussed above. The monitor variables may indicate various types of data that the applicant agrees to allow the computing system 10 to monitor with respect to determining a variable rate premium for vehicle insurance. FIG. 9 illustrates an example visualization of certain monitor variables that have been selected by the applicant to be monitored with regard to determining the variable rate premium. As shown in FIG. 9, the applicant has selected each option except speed and mobile phone activity. As such, the computing system 10, as will be described below, may perform the method 120 with regard to the selected monitored variables.

At block 124, the computing system 10 may retrieve driving record data regarding the applicant from the database 32 or via applicant input. Using the selected monitor variables and the driving record, at block 126, the computing system 10 may determine an initial premium rate for vehicle insurance. The initial premium rate may be a rate that is expected to vary between certain amounts of time (e.g., weekly, bi-weekly, monthly, yearly). When determining the premium rate, the computing system 10 may cross-reference the driving record of the applicant with the selected monitor variables. By way of example, if the driving record indicates that the applicant has a number of citations for speeding and the applicant did not select speed as a monitor variable, the computing system 10 may adjust the premium rate to account for an increased risk associated with the lack of the ability to monitor speed given the previous history of speed citations of the applicant.

In some embodiments, after determining the premium rate, the computing system 10 may display a visualization indicating the determined premium rate via the display 22 or some other display device available to the applicant. For example, the computing system 10 may send a text message or an electronic-mail message to the applicant such that the applicant may be aware of the determined premium rate. In some embodiments, the applicant may receive a visualization indicating the current rate via an application accessible via a mobile computing device such as a smart phone.

Figure 10:
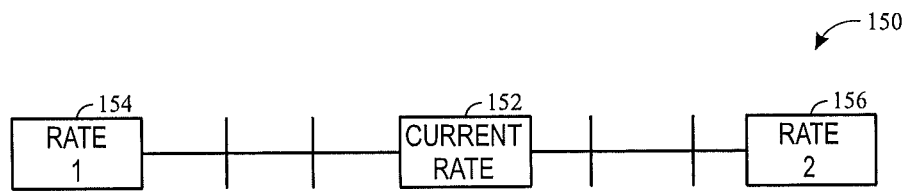
FIG. 10 illustrates an example visualization in an HMI of a current rate of a variable rate policy premium that may vary based on data acquired from data sources of FIG. 1, in accordance with embodiments described herein.

With this in mind, FIG. 10 illustrates an example visualization 150 indicating a current rate 152 of the premium rate. In addition to the current rate 152, the visualization 150 may display a first rate 154 and a second rate 156 that correspond to a lower limit and an upper limit of the premium rate that the computing system 10 may calculate.

Figure 11:
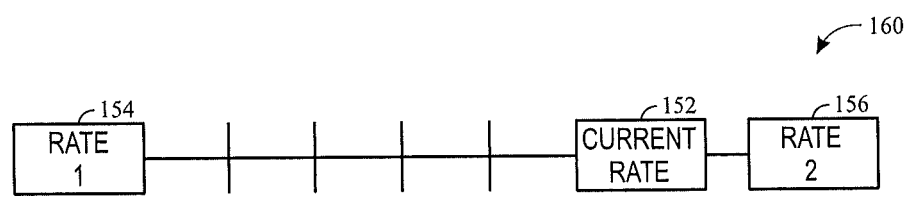
FIG. 11 illustrates an example visualization in an HMI of a current rate of a variable rate policy premium that changed as compared to the rate depicted in the visualization of FIG. 10, in accordance with embodiments described herein.
Figure 12:
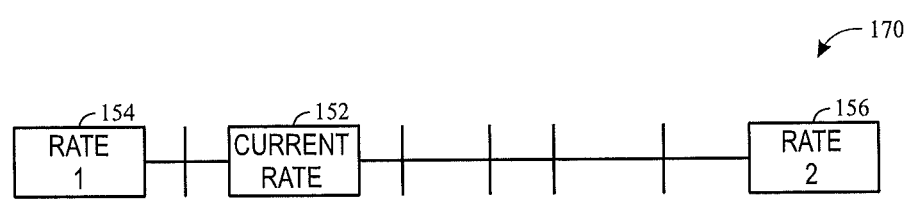
FIG. 12 illustrates an example visualization in an HMI of a current rate of a variable rate policy premium that changed as compared to the rate depicted in the visualization of FIG. 10, in accordance with embodiments described herein.

Referring back to FIG. 8, at block 128, the computing system 10 may begin receiving data regarding the selected monitor variables via the vehicle system 26. At block 130, the computing system 10 may determine whether the received data corresponds to the expected values according to the policy. If the data is not within the expected values, the computing system 10 may proceed to block 132 and adjust the premium rate. FIG. 11, for example, illustrates a visualization 160 that indicates how the current rate 152 may increase when the data received at block 128 is not within the expected values of the policy. In the same manner, FIG. 12 illustrates a visualization 170 that depicts the current rate 152 decreasing.

It should be noted that when the computing system 10 determines whether the received data corresponds to the expected values according to the policy, the computing system 10 may perform similar processes as described above with respect to FIGS. 2, 4, 5, 6, and 7. That is, the processes described above for determining a fixed premium rate may also be employed to provide real-time adjustments in determining a variable premium rate with respect to the method 120 of FIG. 8.

At block 134, the computing system 10 may send a notification to the applicant indicating the adjusted premium rate. As discussed above, the computing system 10 may send a notification via text message, e-mail message, a visualization depicted on a mobile computing device, or the like.

After sending the notification, at block 136, the computing system 10 may send recommended actions for the applicant to consider to reduce the current rate 152. For instance, the computing system 10 may present a list of suggested actions that may reduce the current rate 152 along with a monetary value that corresponds to the amount in which the current rate may change. For instance, the computing system 10 may indicate that reducing the amount of times that the applicant brakes abruptly may reduce the current rate 152 by $5, limiting highway driving may reduce the current rate 152 by $10, taking a defensive driving course may reduce the current rate 152 by $50, and the like. The recommendations may be presented to the applicant in the same manner as the notification of block 134 is presented.

Figure 13:
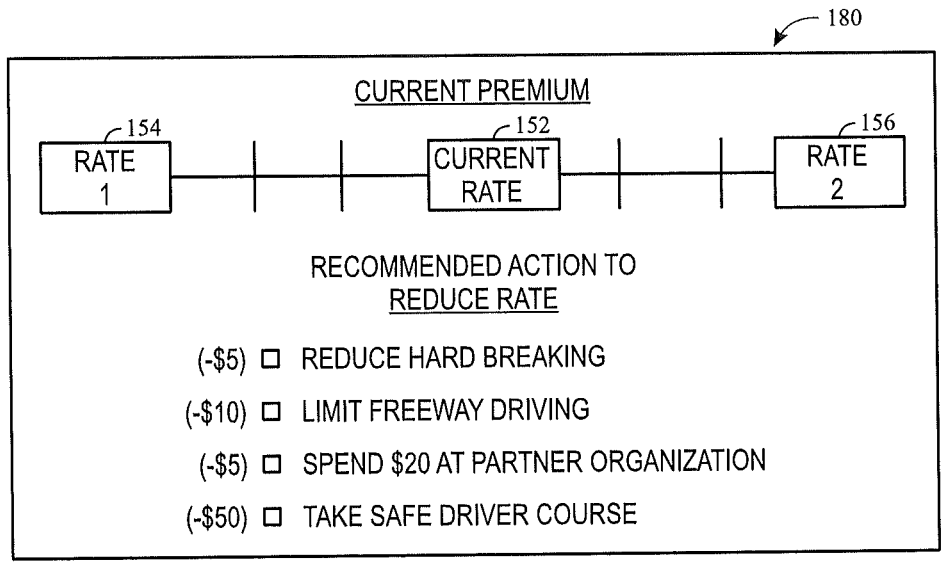
FIG. 13 illustrates an example visualization in an HMI depicting a current rate of a variable rate policy premium along with a list of recommended actions that may reduce the variable rate, in accordance with embodiments described herein.

In some embodiments, the computing system 10 sends information regarding partner networks that the applicant may join to obtain a lower rate. For instance, the insurance provider may have partnership relationships in place with various organizations that provide rate incentives to the applicant when shopping with the partner organization. For example, the computing system 10 may recommend that the applicant purchase a product from a partner organization to receive a certain discount off the current rate 152. In one embodiment, the computing system 10 may present an option to participate in the partner network when requesting a selection of monitor variables as described above with respect to FIGS. 2 and 8. The visualization 58 of FIG. 3 depicts an example option to enable the applicant to select participating in partner networks. In addition, FIG. 13 illustrates an example visualization 180 depicting a current rate 152 along with a list of recommended actions that may reduce the current rate 152. As shown in FIG. 13, the recommended actions may include recommended actions to reduce hard braking, limit freeway driving, spending money at a partner organization, and taking a safe driver course. In certain embodiments, the applicant may select one or more of the recommended actions, and the current rate 152 within the visualization 180 may be adjusted based on the corresponding value of the recommended action. The computing system 10 may also continue to monitor the behavior of the applicant with respect to the selected options to verify that the applicant has adjusted his behavior accordingly and that the current rate 152 should be maintained based on the monitor variables.

Figure 14:
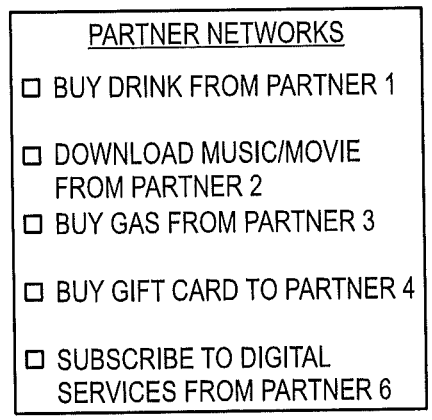
FIG. 14 illustrates a list of partner network options that may be provided to the applicant, in accordance with embodiments described herein.

Upon receiving the selection to participate in a partner network, the computing system 10 may access the database 32 and determine a number of partner relationships that are available to the applicant and the premium discount that may be available to the applicant for each product offered by each partner. FIG. 14, for example, provides a list of partner network options that may be provided to the applicant. As shown in FIG. 14, the partner network options to reduce the current rate 152 may include purchasing a drink from a partner organization, downloading (e.g., via purchase) music or a movie from a partner organization, buying gas from a partner organization, buying a gift card from a partner organization, subscribing to digital services from a partner organization, and the like. If the selection of participating in partner networks is received by the computing system during the methods 40 and 120 of FIGS. 2 and 8, the computing system 10 may determine the fixed or variable premium rate in view of the known relationship with the partner organization.

Referring back to block 130, if the received data is within the expected values of the policy, the computing system may return to block 128 and continue to monitor the data. In some embodiments, if the data indicates that the applicant is driving better than expected, the computing system 10 may decrease the premium rate. As such, the computing system 10 may provide the visualization 170 that indicates to the applicant that the current rate 152 is decreasing. As a result, the decreased rate due to the improved driving behavior may encourage the applicant to drive better and thus reduce his risk score with regard to vehicle insurance. FIG. 12, for example, illustrates the visualization 170 that indicates how the current rate 152 may decrease when the data received at block 128 is lower than the expected values of the policy or indicates that the applicant is associated with less risk than previously determined.

The technical effects of the systems and methods described herein include using data acquired from various sensors to determine fixed rate premiums and to adjust rate premiums in real-time or at regular intervals. By providing an applicant the ability to select his monitor variables, the applicant may control the level of privacy that the applicant may have with respect to the insurance provider. That is, the applicant may limit the amount of data available to the insurance provider, and yet maintain the ability to adjust his rate premium.

Moreover, the present embodiments disclosed herein address post Internet problems such as using the data available via smart homes, smart cars, and wearable devices to provide sufficient insurance coverage for an applicant based specifically on the applicant's behavior. Furthermore, the present embodiments improve the accuracy in determining an appropriate rate premium for insurance services by accounting for the behavior of individual applicants, as opposed to classifying applicants in a general grouping of expected behavior.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
    a wearable device configured to monitor one or more monitor variables related to a human;
    a processor configured to:
        receive a selection of the one or more monitor variables to monitor;
        receive a first set of data from the wearable device associated with a first period of time, wherein the first set of data is limited based on the selection of the one or more monitor variables;
        determine a fixed premium rate for at least two years based on the first set of data;
        disable receiving the first set of data from the wearable device in response to the fixed premium rate being determined;
        receive activity data of the human from the wearable device;
        determine whether the activity data from the wearable device corresponds to one or more policy expectations associated with the fixed premium rate;
        determine an adjusted fixed premium rate in response to determining that the activity data does not correspond to the one or more policy expectations;
        receive a second set of data from the wearable device associated with a second period of time, wherein the second set of data is limited based on the selection of the one or more monitor variables;
        determine an additional fixed premium rate for at least two years based on the second set of data; and
        display a visualization comprising the additional fixed premium rate on a display.

2. The system of claim 1, wherein the wearable device is configured to receive data regarding an amount of steps taken by the human, an amount of floors walked by the human, an amount of time that the human is exercising, an amount of time that the human is sleeping, a plurality of heart rates of the human, or any combination thereof.

3. The system of claim 1, wherein the processor is configured to:
    receive a third set of data from a vehicle system configured to monitor driving behavior of a vehicle; and
    determine the additional fixed premium rate based on the first set of data, the second set of data, and the third set of data.

4. The system of claim 1, wherein the processor is configured to:
    receive a third set of data regarding a driving record associated with the human, a set of criminal records associated with the human, one or more social media posts associated with the human, or any combination thereof; and
    determine the additional fixed premium rate based on the first set of data the second set of data, and the third set of data.

5. The system of claim 1, wherein the processor is configured to:
    determine one or more recommendations to decrease the fixed premium rate based on the first set of data; and
    display the one or more recommendations via the display.

6. The system of claim 1, wherein the processor is configured to:
    receive a third set of data from a home system configured to monitor one or more properties of a home; and
    determine the additional fixed premium rate based on the first set of data, the second set of data, and the third set of data.

7. The system of claim 6, wherein the processor is configured to:
    receive a fourth set of data from a vehicle system configured to monitor driving behavior of a vehicle; and
    determine the additional fixed premium rate based on the first set of data, the second set of data, the third set of data, and the fourth set of data.

8. The system of claim 1, wherein the processor is configured to:
    display an additional visualization comprising a list of one or more actions, wherein each of the one or more actions is associated with a respective monetary value;
    receive a selection of an action of the one or more actions; and
    reduce the additional fixed premium rate by the respective monetary value associated with the action of the one or more actions in response to the selection.

9. The system of claim 1, wherein the processor is configured to:
    receive a third set of data from a database, wherein the third set of data comprises one or more partner network options, and wherein each of the one or more partner network options is associated with a respective discount value;
    display an additional visualization comprising a list of the one or more partner network options;
    receive a selection of a partner network option of the one or more partner network options; and
    reduce the additional fixed premium rate by the respective discount value associated with the partner network option of the one or more partner network options in response to the selection.

10. A method, comprising:
    receiving, via a processor, a selection of one or more monitor variables related to a human;
    receiving, via the processor, a first set of data from a wearable device configured to monitor the one or more monitor variables, wherein the first set of data is limited based on the selection of the one or more monitor variables, and wherein the first set of data is associated with a first period of time;
    determining, via the processor, a fixed premium rate for at least two years based on the first set of data;
    disabling receiving, via the processor, the first set of data from the wearable device in response to the fixed premium rate being determined;

receiving, via the processor, activity data of the human from the wearable device;

determining, via the processor, whether the activity data from the wearable device corresponds to one or more policy expectations associated with the fixed premium rate;

determining, via the processor, an adjusted fixed premium rate in response to determining that the activity data does not correspond to the one or more policy expectations;

receiving, via the processor, a second set of data from the wearable device associated with a second period of time, wherein the second set of data is limited based on the selection of the one or more monitor variables;

determining, via the processor, an additional fixed premium rate for at least two years based on the second set of data; and displaying a visualization comprising the fixed premium rate on a display.

11. The method of claim 10, wherein the wearable device is configured to receive data regarding an amount of steps taken by the human, an amount of floors walked by the human, an amount of time that the human is exercising, an amount of time that the human is sleeping, a plurality of heart rates of the human, or any combination thereof.

12. The method of claim 10, comprising:
receiving, via the processor, a third set of data from a home system configured to monitor one or more properties of a home; and
determining, via the processor, the additional fixed premium rate based on the first set of data, the second set of data, and the third set of data.

13. The method of claim 10, comprising:
receiving, via the processor, a third set of data regarding a driving record associated with the human, a set of criminal records associated with the human, one or more social media posts associated with the human, or any combination thereof.

14. The method of claim 10, comprising:
receiving a third set of data from a vehicle system configured to monitor driving behavior of a vehicle; and
determining the fixed premium rate based on the first set of data, the second set of data, and the third set of data.

15. The method of claim 14, comprising:
disabling receiving the third set of data from the vehicle system in response to the additional fixed premium rate being determined.

16. One or more tangible, non-transitory, machine-readable media comprising instructions that, when executed, are configured to cause one or more processors to perform operations comprising:
receiving a selection of one or more monitor variables related to a human;
receiving a first set of data from a wearable device configured to monitor the one or more monitor variables, wherein the first set of data is limited based on the selection of the one or more monitor variables, and wherein the first set of data is associated with a first period of time;

determining a fixed premium rate for at least two years based on the first set of data;

disabling receiving the first set of data from the wearable device in response to the fixed premium rate being determined;

receiving activity data of the human from the wearable device;

determining whether the activity data from the wearable device corresponds to one or more policy expectations associated with the fixed premium rate;

determining an adjusted fixed premium rate in response to determining that the activity data does not correspond to the one or more policy expectations;

receiving a second set of data from the wearable device associated with a second period of time, wherein the second set of data is limited based on the selection of the one or more monitor variables;

determining an additional fixed premium rate for at least two years based on the second set of data; and displaying a visualization comprising the fixed premium rate on a display.

17. The one or more tangible, non-transitory, machine-readable media of claim 16, wherein the wearable device is configured to receive data regarding an amount of steps taken by the human, an amount of floors walked by the human, an amount of time that the human is exercising, an amount of time that the human is sleeping, a plurality of heart rates of the human, or any combination thereof.

18. The one or more tangible, non-transitory, machine-readable media of claim 16, wherein the instructions are configured to cause the one or more processors to perform operations comprising:
receiving a third set of data from a vehicle system configured to monitor driving behavior of a vehicle; and
determining the additional fixed premium rate based on the first set of data, the second set of data, and the third set of data.

19. The one or more tangible, non-transitory, machine-readable media of claim 16, wherein the instructions are configured to cause the one or more processors to perform operations comprising:
receiving a third set of data from a home system configured to monitor one or more properties of a home; and
determining the fixed premium rate based on the first set of data, the second set of data, and the third set of data.

20. The one or more tangible, non-transitory, machine-readable media of claim 19, wherein the instructions are configured to cause the one or more processors to perform operations comprising:
receiving a fourth set of data from a vehicle system configured to monitor driving behavior of a vehicle; and
determining the additional fixed premium rate based on the first set of data, the second set of data, the third set of data, and the fourth set of data.

* * * * *